May 12, 1959 J. S. SABY 2,886,746

EVAPORATIVE COOLING SYSTEM FOR ELECTRICAL DEVICES

Filed Jan. 5, 1956

INVENTOR:
JOHN S. SABY,

BY Julius J. Zaskalicky
HIS ATTORNEY.

United States Patent Office 2,886,746
Patented May 12, 1959

2,886,746

EVAPORATIVE COOLING SYSTEM FOR ELECTRICAL DEVICES

John S. Saby, North Syracuse, N.Y., assignor to General Electric Company, a corporation of New York Application January 5, 1956, Serial No. 557,532

4 Claims. (Cl. 317—234)

This invention relates to cooling systems for electrical and electronic devices and, more particularly, to such systems utilizing the principle of evaporative cooling.

An evaporative cooling system for electrical devices is shown and described in an application entitled, "Heat-Transfer System" by A. C. Sheckler, Serial No. 406,166, filed January 26, 1954 and assigned to the assignee of the present invention and now abandoned. This invention constitutes an improvement over the evaporative cooling system disclosed in the aforesaid application.

It has been found that portable equipment containing electrical devices, and particularly transistor devices, must often be operable in any position. In many cases, it may no longer be practicable to mount the device to be cooled in the usual position near the bottom of the liquid in a self-contained evaporative cooling system. In fact, in order to achieve approximately equal cooling in any orientation of the device to be cooled, it is often necessary to mount the device near the center of the container which is used for cooling. Such positioning can result in considerable loss of efficiency, since only the upper portion of the fluid is vigorously stirred, the lower portion does not significantly contribute to the cooling. It has been noted that the lower portion of the case or container in such instances remains considerably cooler than the upper portion of the system. Thus, most of the heat which is transferred by the cooling system is conducted out through the upper portion of the case, and the effective radiating area of the case becomes much smaller than the actual total area resulting in inefficient cooling.

Accordingly, it is an object of this invention to provide a new and improved self-contained evaporative cooling system for small-area electrical devices that generate a relatively large amount of heat.

A further object of this invention is to provide a new and improved evaporative cooling system which improves the circulation of the liquid refrigerant such that the transistor or other device to be cooled can be mounted in the center of the cooling case, and the entire area of the case transmits heat nearly uniformly so that the transistor can be operated at full power in any position.

Still another object of this invention is to provide a new and improved self-contained evaporative cooling system which provides a simple and efficient means for cooling transistor and other small-area electric devices which generate large amounts of heat.

In carrying out the present invention in one form, there is provided a sealed enclosure substantially filled with a volatile liquid refrigerant and a device from which heat is to be removed immersed in said liquid. A chimney structure is further provided within said enclosure for promoting the circulation of the refrigerant within the enclosure. Utilizing chimney or duct structures allows vapor-cooled devices to operate efficiently in any position by improving the uniformity of case temperature.

These and other objects of this invention may be more clearly understood by the following description taken in connection with the accompanying drawings, and its scope will be apparent from the appended claims.

In the drawings,

Figure 1 shows one embodiment of this invention employing a cylindrical chimney structure;

Figure 1*a* is a cross-sectional view of Figure 1 taken along section line 1*a*—1*a* of Figure 1;

Figures 1, 1A, 2, 3, 3A, 4, 4A, 5, 5A:
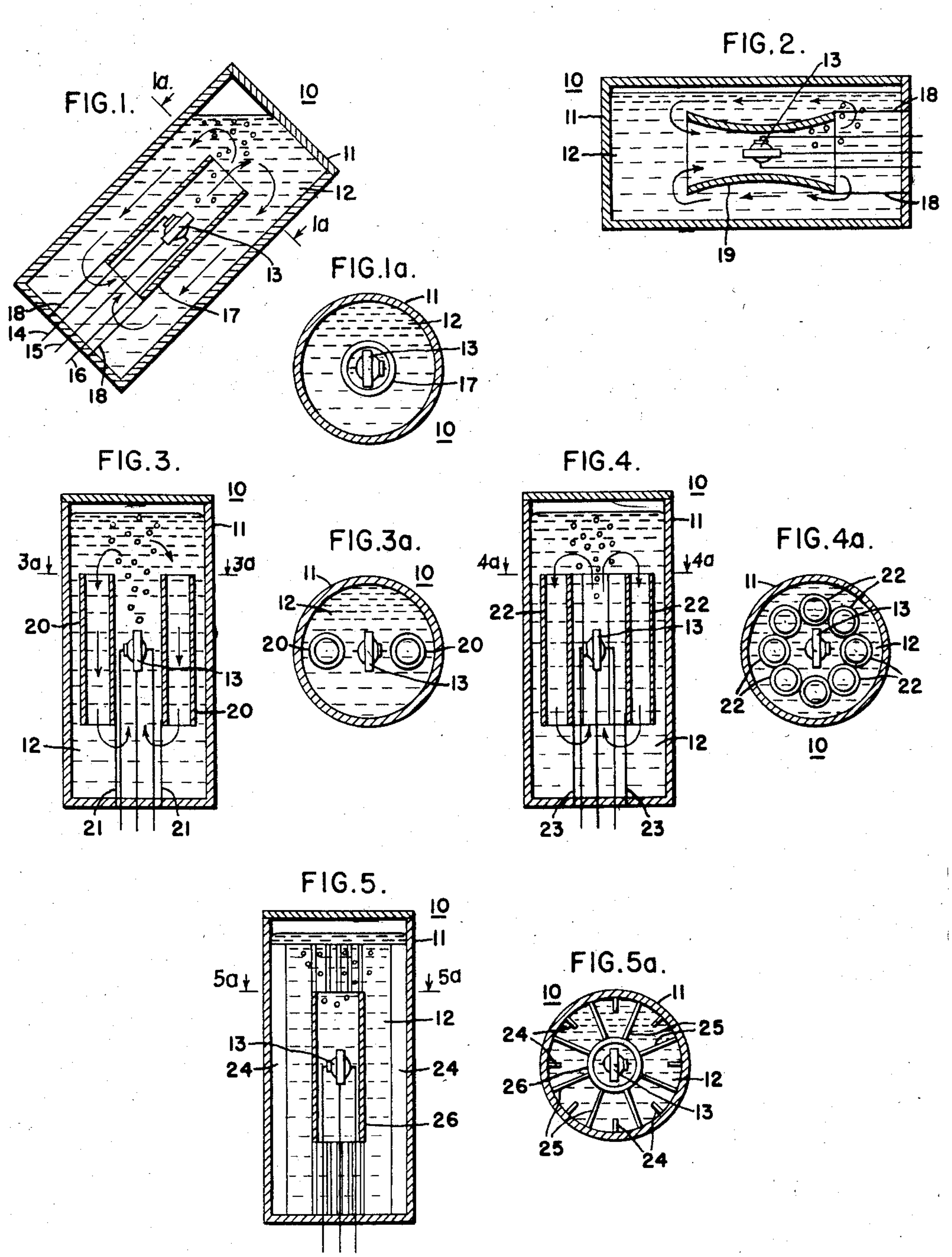
Figure 2 shows another embodiment of the invention employing a duct having a double-flared geometry.
Figure 3 shows still another embodiment of this invention in which the self-contained cooling system employs a pair of cylindrical ducts.

Figure 3*a* is a cross-sectional view of Figure 3 taken along section line 3*a*—3*a* of Figure 3;

Figure 4 shows a further embodiment of this invention in which a plurality of symmetrical chimneys are employed;

Figure 4*a* is a cross-sectional view of Figure 4 taken along section line 4*a*—4*a* of Figure 4;

Figure 5 is a still further embodiment of this invention using a single cylindrical duct and a plurality of heat-conducting fins; and Figure 5*a* is a cross-sectional view of Figure 5 taken along section line 5*a*—5*a* of Figure 5.

Since the present invention has particular utility in connection with small-area electrical devices that generate a relatively large amount of heat per unit volume, such as junction diodes and junction transistors, it is described in conjunction with the use of such devices. However, the invention is not limited thereto, but includes other small-area electrical devices from which heat must be rapidly and effectively removed.

Referring now to Figures 1 and 1*a*, a self-contained evaporative cooling system embodying the principles of this invention is shown and generally designated by the reference numeral 10. The system 10 is comprised principally of a hermetically-sealed container 11, a volatile liquid refrigerant 12, a chimney or duct 17, and an electrical device 13 which is the element to be cooled. Container 11, which consists of a good heat-conducting material such as copper, is substantially filled with a volatile liquid refrigerant 12. The characteristics of liquid 12 are hereinafter described. The small space remaining within the container after the liquid 12 is inserted therein should preferably be evacuated to eliminate all air and other foreign substances. The small-area electrical device 13 which is to be cooled is shown as a junction transistor 13. Transistor 13 is immersed in liquid 12 such that its surfaces are completely submerged and in intimate contact therewith, and is located centrally within the container 11 so that it is completely immersed within the liquid 12 regardless of the orientation of container 11. Leads 14, 15 and 16 are connected to the respective electrodes of transistor 13 and extend through case 11. These leads are insulated from the case and are hermetically-sealed in the wall of container 11. The simple cylindrical chimney 17 is also completely immersed in liquid in a position such that it completely surrounds transistor 13.

Chimney 17 is mounted within the casing by wires or rods 18. Wires 18 should be designed such that they provide a rigid structure for chimney 17, yet do not deter the circulation of fluid 12 within the container. In Figure 1, wires 18 are shown connected to the chimney and the casing 11 in the same general location as the leads 14, 15 and 16. This mounting has been shown and is preferred because of the convenience in having all of the internal connections of the system 10 being made in close proximity, thus facilitating construction. However, as will be obvious to those skilled in the art, other mounting means, such as wires or fins protruding and securing the chimney to other portions of container 11, may be used.

The choice of the volatile liquid refrigerant 12 which substantially fills container 11 depends greatly on the electrical effects which this liquid has on the operation of transistor 13. Generally speaking, liquid 12 must be of high dielectric strength and must not adversely affect the operation of the transistor 13. Low viscosity, high latent heat of vaporization, high specific heat and good wetting properties are also desirable characteristics for the liquid 12. Some liquids which have shown practicability for the invention herein contemplated are normal hexane, carbon tetrachloride and benzene.

When the transistor 13 is connected for operation, current flows through conductors 14, 15 and 16 to the electrodes of transistor 13, causing heat to be generated therein. Since the liquid 12 in container 11 is in direct contact with the surfaces of transistor 13 which are generating heat, this heat is transmitted directly to the surrounding liquid. Liquid 13 is characterized such that when heat is applied, evaporation readily occurs at a temperature close to the ambient temperature of the air surrounding the container. Consequently, as heat is absorbed by liquid 12 from semiconductor 13, the liquid close to the surface of transistor 13 vaporized, forming vapor bubbles which ascend to the space in container 11 which is not filled with liquid. The vapor bubbles and warmer liquid, having a lower density than the liquid, rise and pass through the upper portion of chimney 17, thereby causing cooler liquid to flow through the lower portion of the chimney. This convection and stirring action illustrated in Figure 1 by arrows and bubbles results in the warmer fluid and vapor being discharged at the upper end of chimney 17 and cooling liquid being drawn to the device 13 through the lower end of the chimney. The vapor present in the small space not filled by liquid in container 11 transmits heat to the container which is in immediate contact with the surrounding air. Since the container 11 is a good heat conductor, this heat is transmitted to the outer air, thus cooling the vapor until a temperature is reached which is below its condensation temperature. At this time, the vapor condenses and falls back into the liquid 12. This process is continuous and repetitive as long as transistor 13 remains active. Since the space over the liquid is occupied only by the vapor of liquid 12, the liquid is essentially at its boiling point. Accordingly, liquid 12 and its vapor are at very nearly the same temperature, and heat can be removed with equal effectiveness from any or all portions of the container as convenient.

The tubular chimney structure enhances the benefit received from evaporative cooling by efficiently promoting the circulation of the liquid within case 11. With the use of this chimney structure, the entire area of the case transmits heat nearly uniformly, such that the transistor can be operated at full power in any position or orientation of container 11. Although the chimney design is not critical, the chimney should be as long as possible, subject to the limitation that its length should be limited not to impede circulation by projecting above the liquid in any position. Also, the diameter of the duct or chimney structure should be large enough to prevent large bubbles from filling the tube which would result in intermittent removal of the cooling fluid from the transistor, and may lead to bubble noise or thermal instability. Then too, flow resistance decreases as the chimney diameter increases. However, the chimney diameter should not nearly fill the entire bore of case 11, since the circulation around the outside would thereby suffer. Although chimney 17 is shown in a cylindrical external case 11, chimney structures may be used to enhance the circulation of fluids in a case of any shape. A cylindrical case 11 is shown because it can easily be fabricated from available tubing without resorting to special structures.

As has been previously mentioned, the space in container 11 which is not filled with fluid has been evacuated to prevent the forming of an insulating layer along the upper portion of fluid 12. Such a layer would greatly reduce the efficiency of the cooling system because it would prevent the escape of the vaporized fluid into the space provided for that purpose. Also, if an appreciable amount of air or other non-condensing gas is present, the boiling point of the liquid increases, and a greater temperature rise results in the device being cooled. Consequently, the cooling system becomes less effective.

Figure 2 shows another embodiment of the invention in which a tubular duct 19 having a double-flared geometry is provided surrounding transistor 13. Double-flared duct 19 is secured to container 11 by wires or rods 18 in close proximity to the lead-in-wires for transistor 13. Again, they are mounted in this manner to facilitate assembly. The geometry of duct 19 in which the ends thereof are outwardly flared is particularly adapted to promote circulation within container 11 of the fluid 12 when the device is positioned in a nearly horizontal position. The arrows and bubbles shown in Figure 2 represent the manner of circulation of the fluid 12 within and about chimneys 20. The cooling action is essentially the same as that which was described in connection with Figure 1.

Figures 3 and 3*a* show another embodiment of the invention in which a pair of cylindrical chimneys 20 are positioned diametrically on opposite sides of transistor 13. Chimneys 20 are mounted within case 11 on wires or rods 21. The circulation of fluid 12 within container 11 and within the chimneys 20 is shown in Figure 3.

Figures 4 and 4*a* show still another chimney array for promoting the circulation of the fluid 12 within container 11. In this embodiment, a plurality of cylindrical chimneys are positioned radially within the container 11 by wires or rods 23. This type of array gives increased circulation benefit over the embodiment shown in Figures 3 and 3*a*.

In another embodiment of this invention shown in Figures 5 and 5*a*, an internal fin array is combined with the previously described chimney structure shown in Figure 1. A chimney 26 which surrounds transistor 13 is mounted on a series of radial fins 25 which are connected directly to case 11. A series of smaller fins 24 are mounted on case 11 intermediate said large fins 25. Internal fins 25 provide an increased internal surface of the case 11 for direct transmittal of heat to the external casing 11. They also provide mechanical support for the chimney 26 which provides improved heat flow because of the chimney structure. The fin structure shown in Figures 5 and 5*a* thus becomes a part of the chimney flow system to enhance the removal of heat from transistor 13.

The aforesaid embodiments which comprise this invention thus provide heat transfer from a device 13 to the enclosure 11 and then to the surrounding air by the vaporization and condensation action of the liquid refrigerant 12 within case 11.

In the above embodiments heat transfer is also promoted by the mechanical stirring of the fluid 12 within the container 11. This action is enhanced by the use of the chimney structures shown. The boiling action in the chimneys when utilized in the structure above described provides a more positive circulating, pumping action than would be achieved either by simple connective chimneys in a non-boiling liquid or by the boiling action itself without chimneys. As the fluid is moved within the container, heat is transmitted from the fluid directly to all portions of the container 11, and then is dissipated by the surrounding air. This type of action makes use of the entire case area for heat dissipation. Thus, chimney structure has been applied to the evaporative cooling systems to provide a simple, practical means for improving the circulation of the liquid 12 in vapor-cooled structures to effectively cool devices such as transistors and diodes for portable equipment which must be capable of being operable in any position.

Since other modifications varied to fit particular operating requirements and environments will be apparent to those skilled in the art, the invention is not considered limited to the examples chosen for purposes of disclosure and covers all modifications and changes which do not constitute departures from the true spirit and scope of this invention.

What I claim as new and desire to secure by Letters Patent of the United States is:

1. In combination, an evacuated heat-conductive enclosure, a volatile electrically insulating liquid contained within said enclosure and filling a substantial portion thereof, an electrical device having at least one heat-generating portion thereon which needs to be cooled, means for completely submerging said electrical device in said liquid, whereby said heat-generating portion is in direct contact with said liquid, an elongated tubular duct having double outwardly-flared end portions thereon, and means mounting said duct in said container such that said duct surrounds said electrical device.

2. A self-contained cooling system for an electrical device comprising a sealed heat-conductive container having air and foreign substances removed therefrom, a volatile liquid filling a substantial portion of said container, said liquid having a high dielectric strength, means for immersing an electrical device in said liquid, whereby said liquid is in direct contact with the surfaces of said device to be cooled, a plurality of cylindrical chimney means, said chimney means being mounted within said container on diametrically opposite sides of said electrical device.

3. A self-contained cooling system for an electrical device comprising a hermetically-sealed evacuated conductive container, a volatile liquid refrigerant substantially filling said container, an electrical device which is to be cooled immersed in said liquid refrigerant, a surface of said electrical device being in direct contact with said refrigerant, means for making electrical connections to said electrical device, a cylindrical chimney means surrounding said electrical device, a plurality of heat-conductive fins connected to and mounting said cylindrical chimney means in said container for promoting circulation within said container and for removing heat therefrom.

4. A self-contained cooling system for an electrical device comprising a sealed heat-conductive container having air and foreign substances removed therefrom, a volatile liquid filling a substantial portion of said container, said liquid having a high dielectric strength, an electrical device, means for mounting said electrical device in said liquid, whereby said liquid is in direct contact with the surfaces of said device, and a duct means having a plurality of cylindrical chimneys opened at both ends, said chimneys being mounted radially around said electrical device to completely encompass said electrical device, thereby facilitating the movement of said liquid in said container with respect to said electrical device.

References Cited in the file of this patent

UNITED STATES PATENTS

| | | |
|---|---|---|
| 2,023,226 | Harty | Dec. 3, 1935 |
| 2,169,109 | Muller | Aug. 8, 1939 |
| 2,288,341 | Addink | June 30, 1942 |

FOREIGN PATENTS

| | | |
|---|---|---|
| 51,318 | Netherlands | Oct. 15, 1941 |